Jan. 5, 1971    G. F. STROMBERG ET AL    3,553,577
ACTIVE PROPELLANT GRAIN REGRESSION RATE MONITOR
FOR ROCKET ENGINES
Filed Jan. 23, 1968

INVENTORS
GALE F. STROMBERG,
JOHN F. EASTON
BY Harry A. Herbert Jr.
ATTORNEY
Henry S. Miller Jr.
AGENT

United States Patent Office 3,553,577
Patented Jan. 5, 1971

3,553,577
ACTIVE PROPELLANT GRAIN REGRESSION RATE MONITOR FOR ROCKET ENGINES
Gale F. Stromberg and John F. Easton, San Jose, Calif., assignors to the United States of America as represented by the Secretary of the Air Force
Filed Jan. 23, 1968, Ser. No. 699,851
Int. Cl. G01n 27/02
U.S. Cl. 324—65
1 Claim

ABSTRACT OF THE DISCLOSURE

A propellant grain regression rate monitor for rocket engines including a plurality of shunted resistors serially connected and located in the rocket fuel and further connected in a circuit with a power source and a recorder. Consumable fuze wires shunting the resistors whereby the current in the circuit is changed each time the flame front consumes one of the wires.

BACKGROUND OF THE INVENTION

In order to determine accurately the ballistic characteristics of solid fuel rockets, it is important that the amount of grain consumed as a function of time be determined. In the case of a hybrid propulsion system, the fuel regression rate varies continuously during operation. Hence, the determination of ballistic performance in a motor which has been operated at various thrust levels becomes extremely difficult.

In prior art devices for the measurement of the grain regression rate each data point required a separate sensor and data recording channel. This in turn made it necessary to add a hole through the rocket motor case which constituted a potential failure point for the pressure vessel.

In some prior art devices, light transmitting rods were used as sensors; however, the data obtained by this means was of questionable accuracy because the position of the end of the light transmitting rod could not be measured accurately. Further, rods installed prior to casting the fuel were subject to binding stresses and frequent cracking as the fuel cured. Rods installed after the fuel grains were cast were inserted into drilled holes, the depth of which was difficult to determine due to the elastic nature of the hybrid fuel.

In other prior art devices using light transmitting rods, it was found that the data obtained was difficult to interpret because the transducer output voltages gradually increased as the flame surface progressed toward the end of the light transmitting rods, causing a shift in the data traces before full output was obtained.

SUMMARY OF THE INVENTION

The instant invention overcomes the disadvantages of prior art devices by incorporating a plurality of individual sensors and associated electronics into a single assembly which can be attached to the inside of the motor case and have a single pair of leads coming through a gas tight fitting in the side of the motor. This invention uses an exothermic fuze wire to shunt fixed resistors in an electronic circuit. A resistance change occurs when the fuze wire is actuated by the flame front on the propellant surface. The changes in electrical output are recorded to indicate the time differences between activation of successive fuze wires. Any desired number of fuze wires can be used to provide the number of data points required.

The apparatus of this invention is cast into the propellant grain and requires only two electrical leads passing through a motor case pressure seal to transmit the data. With the elimination of the light conducting rods, certain problems regarding the charring of the ends of the rod have been eliminated thus providing a more reliable as well as a more accurate device than any hitherto known.

DESCRIPTION OF THE PREFERRED EMBODIMENT

Figure 1:
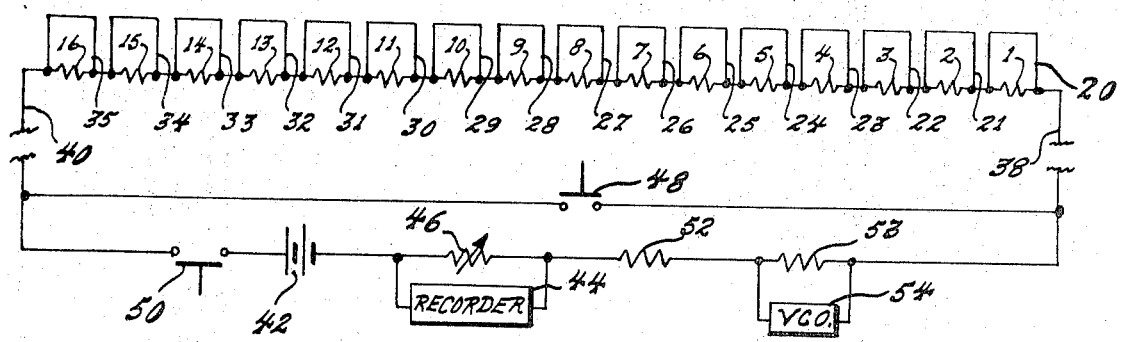
FIG. 1 is a circuit diagram utilized in the preferred embodiment of this invention.

Referring now to FIG. 1, exothermic fuze wires 20–35 are utilized to shunt fixed resistors 1–16 in the electronic circuit. A resistance change occurs when the fuze is actuated by the flame front on the propellant surface. The changes in electrical output are recorded to indicate the time differences between successive fuze wires. The invention is not limited to the number of sensing units disclosed in that more or less may be needed to provide data points required. Since the sensors described are cast into the propellant grain, only two electrical leads 38 and 40 pass through a motor case pressure seal to transmit the data. Inside the control room instrumentation for the sensing units is provided. The remainder of the circuit contains a D.C. power source 42 while a conventional recorder 44 is provided with a variable resistance 46 which permits calibrating of the recorder when the range switch 48 and the power switch 50 are closed. The circuit further includes current control resistors 52 and 53 and a voltage control oscillator 54 which converts the analog voltage to a frequency which is then recorded on a tape in the recorder 44.

Figure 2:
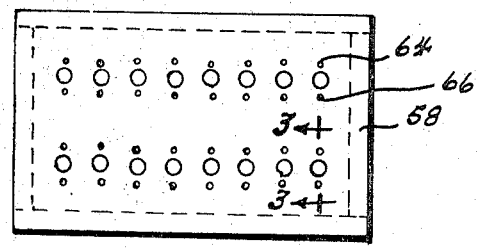
FIG. 2 is a top view of the preferred embodiment of this invention.
Figure 3:
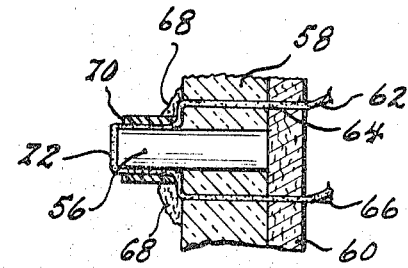
FIG. 3 is a cross-sectional view of FIG. 2 taken along the lines 3—3.
Figure 4:
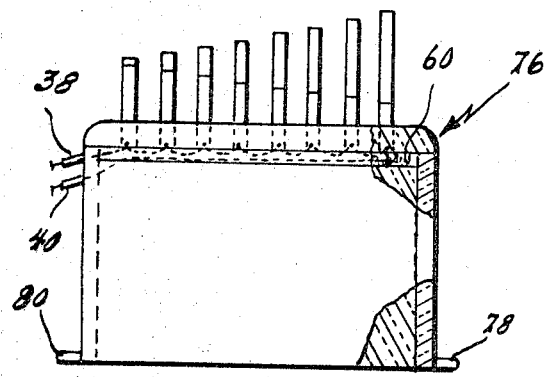
FIG. 4 is a side-elevation view partly in section of the invention.
Figure 5:
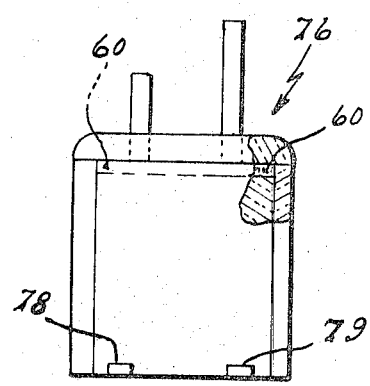
FIG. 5 is an end view partly in section of the invention.

FIG. 2 is a top view of a preferred embodiment where the probes 1–16 are arranged in two parallel linear series. The probes may be formed of various configurations depending upon the propellant and the rocket engine to be monitored. The probes mounted as shown in FIG. 3 where a plastic rod 56 is bonded to the paper phenolic mounting plate 58 which is in turn affixed to a layer of paper base phenolic laminate 60. The wire 62 is fed through a pair of holes 64 and 66 in the mount and bonded to the top of the mounting plate 58, at 68 a layer of insulating material 70 surrounds the rod 56 and holds the wire in a secure relationship next to the rod. At the point where the wire is exposed to the flame front and continues over the end of the rod 72 the wire is formed of an exothermic fuze wire or pyrofuse. As the flame front of the rocket engine reaches each probe the fuze wire burns through, actuating it and causing a change in the resistance of the entire circuit. The monitoring devices are located on a consumable Plexiglas mount 76 as shown in FIGS. 4 and 5. The probes are located so they protrude from the mount into the propellant at different predetermined locations. The monitor is placed in the motor prior to the casting of the propellant grain and secured to the side of the motor by conventional means 78 and 80. In this manner it is possible to measure the exact location of the monitors and hence it will be possible to accurately determine the location of the flame front. The leads 38 and 40 extend from the mount and through an opening in the side of the motor. The volume inside the mount below the sensors 20–35 contains the fixed resistors 1–16 and the void is filled with an insulating material, such as epoxy, which provides structural integrity.

We claim:
1. A propellant grain regression rate monitoring system for rocket engines comprising: a consumable Plexiglas mounting assembly adapted to be attached to the internal wall of a rocket motor casing; a plurality of consumable sensing means affixed to and extending from the mounting assembly; each of the sensing means comprising a Plexiglas rod, an exothermic fuse wire having an input end and an output end, said fuse wire being mounted to follow the perimeter of the rod and having a portion thereof extending across one end of said rod, insulating means surrounding the rod and wire, and a fixed resistor connected between the input and output ends of the exothermic fuse wire, a plurality of said sensing means being connected in electrical series, a voltage source connected across the series connected sensing means, and recording means for recording a decrease in current as said fuse wire is consumed and breaks the shunt circuit across said fixed resistor.

References Cited

UNITED STATES PATENTS

| | | | |
|---|---|---|---|
| 2,870,434 | 1/1959 | Schulze | 340—227.1 |
| 2,871,466 | 1/1959 | Vassil et al. | 340—227.1 |
| 2,410,278 | 10/1946 | Farris et al. | 324—10X |
| 2,553,129 | 5/1951 | Burnett | 33—174 |
| 3,078,707 | 2/1963 | Weaver | 73—86X |
| 3,236,096 | 2/1966 | Macatician et al. | 73—86 |
| 3,357,237 | 12/1967 | LeBel | 340—228 |

FOREIGN PATENTS

| | | | |
|---|---|---|---|
| 1,026,167 | 4/1953 | France | 324—65 |

EDWARD E. KUBASIEWICZ, Primary Examiner

U.S. Cl. X.R.

73—86; 340—227.1